US011349253B2

(12) United States Patent
Arditty et al.

(10) Patent No.: US 11,349,253 B2
(45) Date of Patent: May 31, 2022

(54) METHOD FOR CONNECTING TWO CONNECTOR PARTS

(71) Applicant: IXBLUE, Saint-Germain-en-Laye (FR)

(72) Inventors: Hervé Arditty, Saint-Germain-en-Laye (FR); Sébastien Grall, Saint-Germain-en-Laye (FR); Jonathan Laporte, Saint-Germain-en-Laye (FR); Christian Giroussens, Saint-Germain-en-Laye (FR); Gildas Touin, Saint-Germain-en-Laye (FR); Frédéric Mosca, Saint-Germain-en-Laye (FR); Eric Delort, Saint-Germain-en-Laye (FR); Carole Chaize, Saint-Germain-en-Laye (FR)

(73) Assignee: IXBLUE, Saint-Germain-en-Laye (FR)

( * ) Notice: Subject to any disclaimer, the term of this patent is extended or adjusted under 35 U.S.C. 154(b) by 0 days.

(21) Appl. No.: 16/770,197

(22) PCT Filed: Dec. 5, 2018

(86) PCT No.: PCT/FR2018/053119
§ 371 (c)(1),
(2) Date: Jun. 5, 2020

(87) PCT Pub. No.: WO2019/110930
PCT Pub. Date: Jun. 13, 2019

(65) Prior Publication Data
US 2020/0395707 A1    Dec. 17, 2020

(30) Foreign Application Priority Data

Dec. 5, 2017 (FR) ...................... 1761667

(51) Int. Cl.
*H01R 13/523* (2006.01)
*H01R 13/533* (2006.01)
(Continued)

(52) U.S. Cl.
CPC ......... *H01R 13/523* (2013.01); *H01R 13/533* (2013.01); *H01R 43/26* (2013.01); *H02G 1/10* (2013.01)

(58) Field of Classification Search
CPC .... H01R 13/523; H01R 13/533; H01R 43/26; H01R 24/00; H02G 1/10
(Continued)

(56) References Cited

U.S. PATENT DOCUMENTS 3,665,509 A    5/1972  Elkins
4,848,472 A *  7/1989  Hopper ............... E21B 33/0355
                                                166/344
(Continued)

FOREIGN PATENT DOCUMENTS

EP      0 480 773 A1    4/1992
GB      2 501 249 A    10/2013
WO      99/60246 A1    11/1999

OTHER PUBLICATIONS

International Search Report and Written Opinion, dated Mar. 11, 2019, from corresponding/related International Application No. PCT/FR2018/053119.

*Primary Examiner* — Abdullah A Riyami
*Assistant Examiner* — Nelson R. Burgos-Guntin
(74) *Attorney, Agent, or Firm* — Nixon & Vanderhye

(57) ABSTRACT

A method for connecting a movable connector part to a stationary connector part, the movable part being initially placed on a support and the stationary part being covered by a cap. The method includes gripping the cap by element of a lifting tool (10); depositing the cap (6) on the movable part
(Continued)

by element of the lifting tool; and transporting the assembly of the cap and movable part onto the stationary part, by element of the lifting tool, in order to connect the stationary part and the movable part (4) to each other.

9 Claims, 6 Drawing Sheets

(51) Int. Cl.
*H01R 43/26* (2006.01)
*H02G 1/10* (2006.01)

(58) Field of Classification Search
USPC .......................................... 439/271
See application file for complete search history.

(56) References Cited

U.S. PATENT DOCUMENTS

| | | | | |
|---|---|---|---|---|
| 5,005,650 A * | 4/1991 | Hopper | ............... | E21B 41/10 |
| | | | | 166/339 |
| 6,223,675 B1 * | 5/2001 | Watt | ............... | B63G 8/001 |
| | | | | 114/312 |
| 6,390,012 B1 * | 5/2002 | Watt | ............... | B63B 27/36 |
| | | | | 114/322 |
| 6,805,382 B2 * | 10/2004 | Jennings | ............... | F16L 37/002 |
| | | | | 166/341 |
| 7,535,706 B2 * | 5/2009 | Herberholt | ............... | B60L 53/14 |
| | | | | 361/679.41 |
| 8,870,234 B2 * | 10/2014 | Braud | ............... | B63B 22/026 |
| | | | | 285/302 |
| 9,203,184 B1 * | 12/2015 | Hui | ............... | H01R 13/629 |
| 9,905,956 B2 * | 2/2018 | Feldchtein | ............... | H01R 13/64 |
| 10,454,205 B2 * | 10/2019 | Arditty | ............... | G02B 6/3817 |
| 10,987,768 B2 * | 4/2021 | Sleet | ............... | E21B 41/0007 |
| 2006/0128196 A1 * | 6/2006 | McKinnon | ............... | H01R 13/523 |
| | | | | 439/201 |
| 2011/0150394 A1 * | 6/2011 | Sorensen | ............... | H01R 13/523 |
| | | | | 385/53 |
| 2015/0295345 A1 * | 10/2015 | Hodnefjell | ............... | H01F 38/14 |
| | | | | 439/587 |
| 2016/0308300 A1 * | 10/2016 | Lewin | ............... | H01R 13/53 |
| 2016/0346883 A1 * | 12/2016 | Walton | ............... | B23P 19/069 |
| 2018/0013227 A1 * | 1/2018 | Arditty | ............... | H01R 13/523 |
| 2018/0351285 A1 * | 12/2018 | Bigi | ............... | H01R 13/523 |
| 2020/0395707 A1 * | 12/2020 | Arditty | ............... | H01R 13/523 |

* cited by examiner

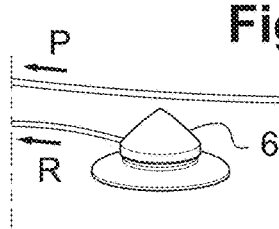
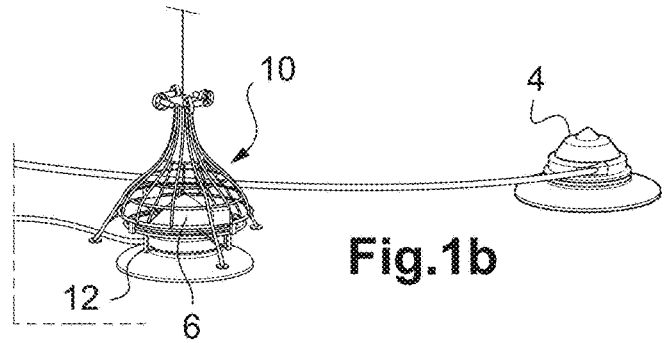
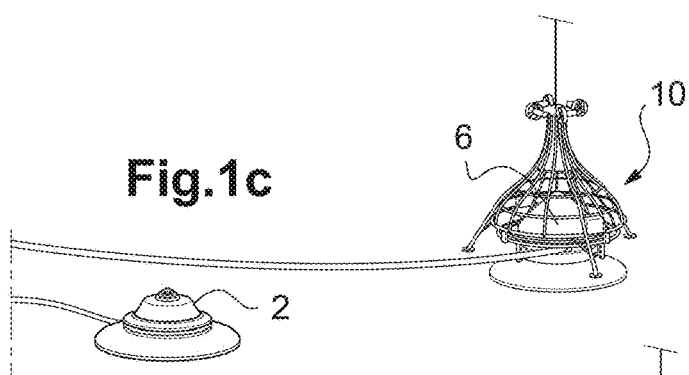
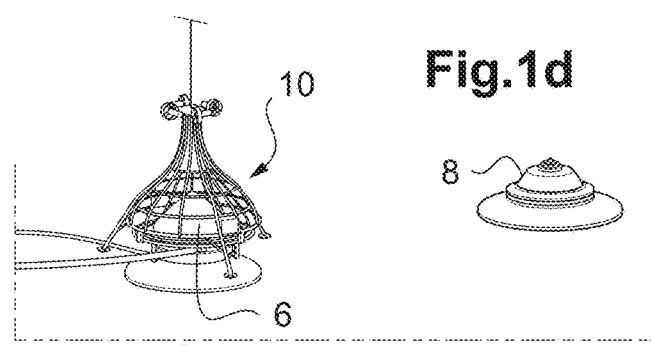
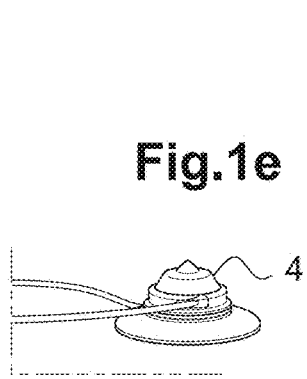

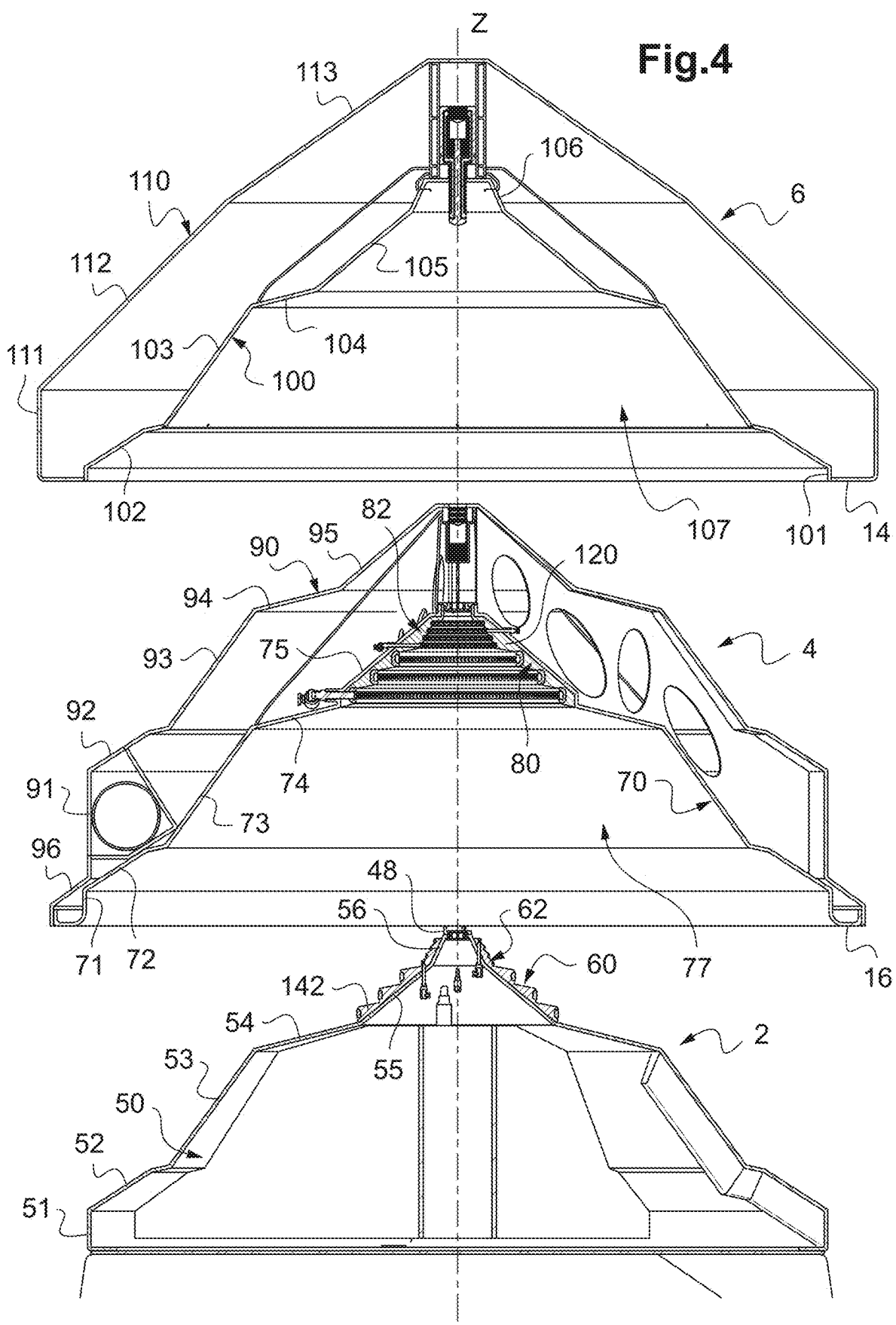

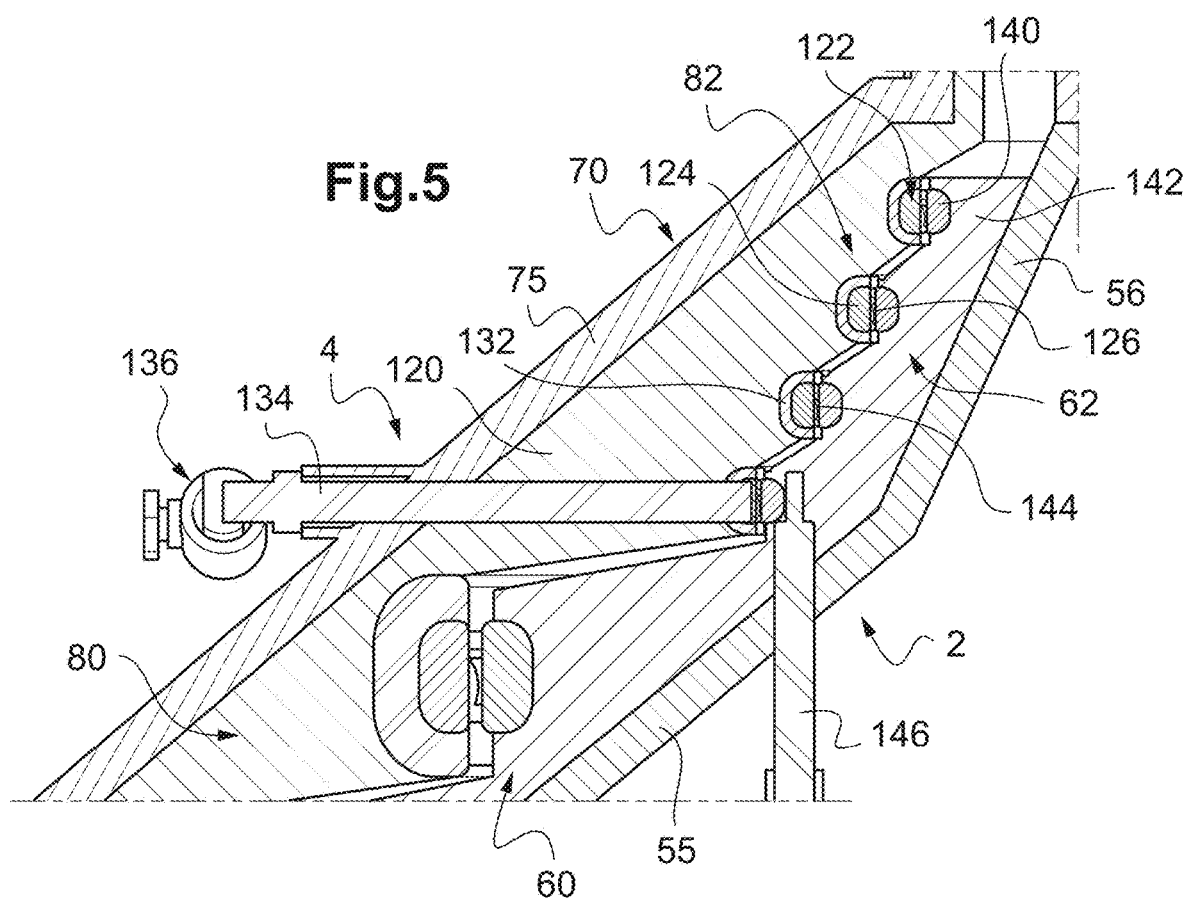

METHOD FOR CONNECTING TWO CONNECTOR PARTS

TECHNICAL FIELD TO WHICH THE INVENTION RELATES

The present invention generally relates to the connection of underwater cables intended, for example, to transport the electricity produced by hydrokinetic turbines.

It more particularly relates to a method for connecting two connector parts.

TECHNOLOGICAL BACK-GROUND

Underwater connectors are known, which are connectable under water, such feature being sometimes called "wet-mate".

In the known devices, the coupling of two complementary connectors requires a precise alignment of one connector with respect to the other along a horizontal axis and the application of opposite horizontal forces for the connection of the two connectors.

Such a design involves the use of alignment mechanisms with 5 degrees of freedom in the case of coaxial connectors and with 6 degrees of freedom in the case of pin connectors. Other mechanisms must moreover be provided for the application of the horizontal connection forces.

That way, the known connectors are complex and the establishment of a connection by the coupling of two connectors is a tricky procedure.

Such solutions can hence not suit when the time available to perform the connection is limited, as is the case for example for the connection of underwater cables intended to transport the electricity produced by hydrokinetic turbines. Indeed, such installations are located in places where the sea current is strong and where the favourable period for a connection (generally during the slack) is hence of short duration.

OBJECT OF THE INVENTION

In this context, the present invention proposes a method for connecting a movable connector part to a stationary connector part, characterized in that, initially, the movable part is placed on a support and the stationary part is covered by a cap, and in that the method comprises the following steps:
gripping the cap using a lifting tool;
depositing the cap onto the movable part using the lifting tool;
transporting, using the lifting tool, the cap—movable part unit onto the stationary part for connecting the stationary part and the movable part to each other.

The intervention time required for connecting the stationary part and the movable part to each other is hence minimized, while benefiting from the protection of the stationary part afforded by the cap previously to the intervention.

Other optional (and hence non-limitative) features of the electrical connector according to the invention are the following:
the movable part comprises a lower casing having at least one truncated portion and an upper casing having at least one truncated portion, the truncated portion of the lower casing being, at any point, parallel to the truncated portion of the upper casing;
the connection method comprises a subsequent step of depositing the cap onto the support using the lifting tool;
the stationary part is fixed to a seabed;
the support is fixed to a seabed;
the stationary part is connected to an electric power transmission system;
the movable part is connected to an electric power generator (such as a hydrokinetic turbine);
the stationary part comprises a convex external cover having a rotational symmetry;
the stationary part comprises a plurality of circular electrical tracks;
the movable part has a concavity designed to cooperate with said external cover;
the cap comprises means for receiving a fluid and means for injecting said fluid into at least one duct formed in the movable connector.

DETAILED DESCRIPTION OF AN EXEMPLARY EMBODIMENT

The following description in relation with the appended drawings, given by way of non-limitative examples, will allow a good understanding of what the invention consists of and of how it can be implemented.

In the appended drawings:

FIGS. 1a to 1f show steps of a sequence of connection of a movable connector part to a stationary connector part;

FIG. 4 shows the elements of FIG. 3, separated from each other;

FIG. 5 shows a detailed view of connection assemblies used in certain elements of FIG. 3;

FIG. 6 shows a metal comb used in at least certain of the connection assemblies of FIG. 5.

Figure 2:
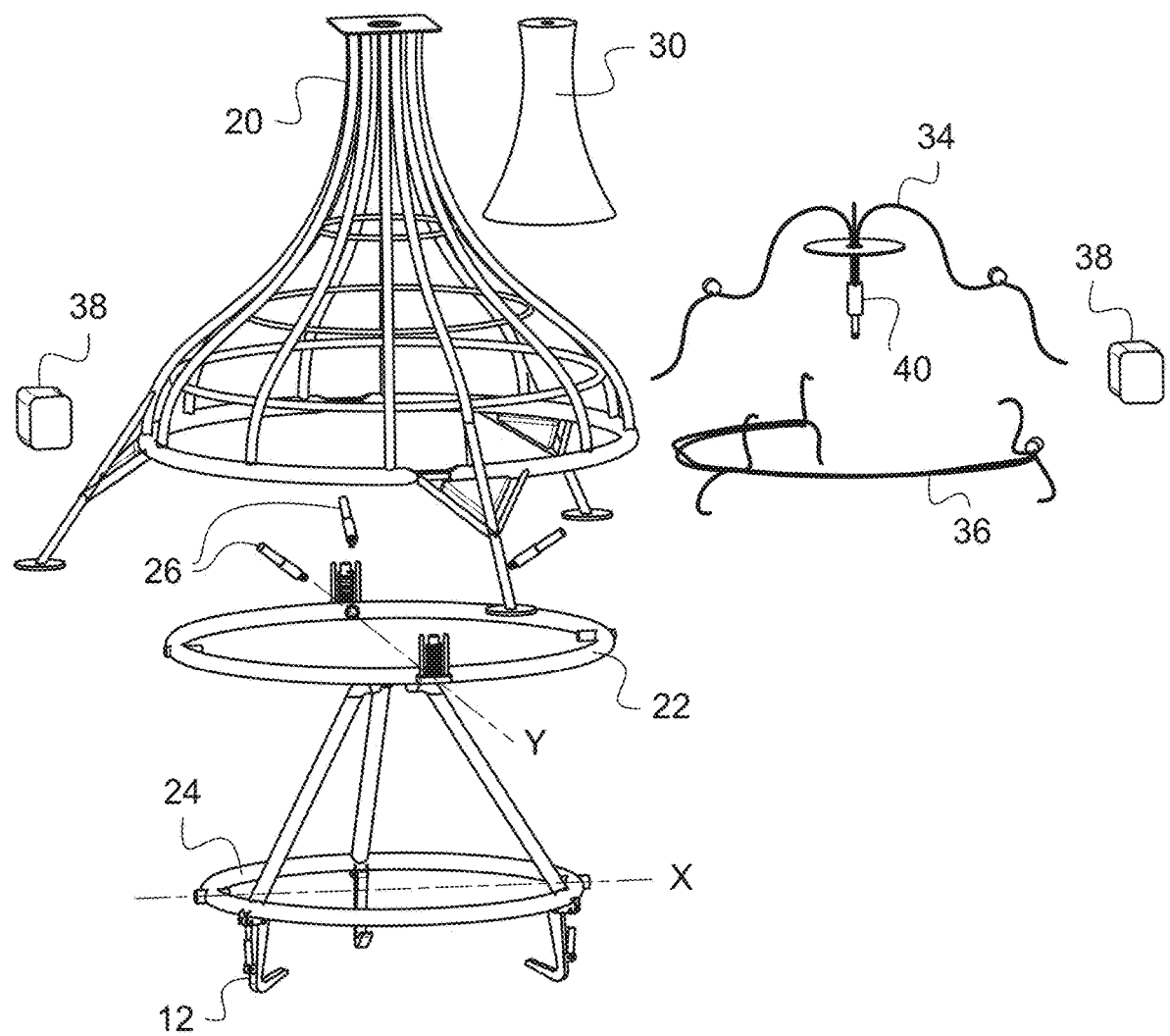
FIG. 2 is an exploded perspective view of a lifting tool used in this sequence of connection.

The main steps of a sequence of connection of a movable connector part 4 to a stationary connector part 2 will be first described. The detailed description of a conceivable example for implementing these stationary and movable connector parts will then be given.

At the initial step shown in FIG. 1a, the stationary part 2 (not visible in this Figure) is covered by a cap 6 (which makes it possible to protect connection tracks present on the stationary part 2), whereas the movable part 4 is placed on a support 8 (not visible in this Figure).

The stationary part 2 and the support 8 are fixed to a seabed, as schematically shown in FIGS. 1a to 1f.

The movable part 4 is for example connected to an electric power generator (here a hydrokinetic turbine); the stationary part 2 can, in this case, be connected to an electric power transmission system. (A reverse configuration is however conceivable).

Connecting the movable part 4 to the stationary part 2, as described herein, hence allows connecting the electric power generator to the electric power transmission system that is to be power supplied by this generator.

The connection method starts by a step of gripping the cap 6 using a lifting tool 10 (described in detail hereinafter with reference to FIG. 2), as shown in FIG. 1b.

In the example described herein, hooks 12 provided on the lifting tool 10 cooperate with a gripping surface 14 provided on the cap 6. In practice, the gripping surface 14 is for example horizontal and turned downward, the hooks 12 being movable and placed under the gripping surface 14 during this gripping step.

The lifting tool 10 hence carries the cap 6 (here thanks to the positioning of the hooks 12 under the gripping surface 14 and to the gravity) and can hence displace this cap 6 towards the movable part 4 (and the support 8 on which this movable part 4 is placed). The lifting tool 10 here has for that purpose its own displacement means, as explained hereinafter with reference to FIG. 2.

The connection method then continues with depositing the cap 6 onto the movable part 4 using the lifting tool 10, as shown in FIG. 1c.

Precisely, the lifting tool 10 moves up to place a lower external surface of the cap 6 onto an upper external surface of the movable part 4 (this upper external surface of the movable part 4 being at least partially complementary of the lower external surface of the cap 6, as described in details hereinafter). The hooks 12 are then displaced (here spaced apart) so as to release the cap 6.

The lifting tool 10 then picks up the cap 6—movable part 4 unit to transport this unit towards the stationary part 2. In the described example, the hooks 12 are displaced so as to cooperate with a gripping surface 16 (here horizontal and turned downward) so that the lifting tool 10 carries the movable part 4, which itself carries the cap 6.

The connection method can then continue with a step in which the lifting tool 10 transports the cap 6—movable part 4 unit to the stationary part 2.

For that purpose, the lifting tool 10 moves up to place a lower external surface of the movable part 4 onto an upper external surface of the stationary part 2 (this upper external surface of the stationary part 2 being at least partially complementary of the lower external surface of the movable part 4, as described in more detail hereinafter). The hooks 12 are then displaced (here spaced apart) in order to release the cap 6.

As will be understood from the description of the stationary part 2 and the movable part 4 hereinafter, this deposition of the movable part 4 (that moreover carries the cap 6) onto the stationary part 2 allows the connection of the stationary part 2 and the movable part 4.

The situation is shown in FIG. 1d.

The lifting tool 10 can then take up the cap 6 (here by displacing the hooks 12 under the gripping surface 14 of the cap 6) and move towards the support 8 (visible in FIG. 1d) so as to finally deposit the cap 6 onto the support 8, as shown in FIG. 1e.

The lifting tool 10 then displaces the hooks 12 so as to release the cap 6, which then remains on the support 8, as shown in FIG. 1f (after the lifting tool 10 has left).

An exemplary embodiment of the lifting tool 10 will now be described with reference to FIG. 2.

The lifting tool 10 comprises a main body 20, here forming a cage of flared shape (with a diameter that increases towards the bottom), made for example from metal tubes.

A first ring 22 is mounted on the main body 20 (here in the lower portion of the first ring 22) with a possibility of rotation about an axis Y (this axis Y being substantially horizontal when the lifting tool 10 is in its working position shown in FIGS. 1b to 1e and 2).

A second ring 24 is mounted on the first ring 22 (by being here surrounded by the first ring 22) with a possibility of rotation about an axis X perpendicular to the axis Y (the axis X being also substantially horizontal when the lifting tool 10 is in its working position shown in FIGS. 1b to 1e and 2).

The second ring 24 carries the already-mentioned hooks 12 (here three in number). As already indicated, each hook 12 can be displaced (here by means of cylinders) in order to be placed under an object to be transported (movable part 4 and/or cap 6) or, on the contrary, to release this object.

The mounting of the second ring 24 on the main body 20 through the first ring 22, and hence with two rotational degrees of freedom, allows any direction of the second ring 24, and thus of the transported object (movable part 4 and/or cap 6) with respect to the main body 20.

The lifting tool 10 also comprises centring fingers 26 (herein three centring fingers 26 equidistributed over the circumference of the lifting tool 10), mounted for example on the main body 20. Each centring finger 26 is extensible and hence makes it possible, when its free end comes against the transported object (movable part 4 and/or cap 6), to vary the direction of the transported object (also thanks to the possibilities of rotation about the axes X and Y as already indicated).

This makes it possible, in particular, to align the movable part 4 with the stationary part 2 during the connection step described hereinabove with reference to FIG. 1b.

The lifting tool 10 also comprises a float 30 and a propelling unit 32 (here comprising four propellers), which form the above-mentioned own displacement means.

The lifting tool 10 comprises an upper hydraulic system 34 for injecting oil into the movable part 4 by means of an injection needle 40, as explained hereinafter.

The lifting tool 10 comprises a lower hydraulic system 36 for suppling the above-mentioned cylinders (used to displace the hooks 12) with oil.

The upper hydraulic system 34 and the lower hydraulic system 36 are connected to oil tanks 38.

An exemplary embodiment of the stationary part 2, the movable part 4 and the cap 6 will now be described with reference to FIGS. 3 and 4.

The stationary part 2 has a general shape that is rotationally symmetrical about an axis Z (here corresponding to the vertical at the place of implantation of this stationary part 2 on the seabed) and tapering towards an apex 48 (i.e. upward). In other words, the stationary part 2 has a surface in horizontal cross-section that continuously decreases along the axis Z and towards the top.

More precisely, the stationary part 2 comprises a casing 50 (forming a convex external cover) that includes from the bottom to the top (i.e. from the base of the stationary part 2 attached to the seabed to the apex of the stationary part 2):

- a cylindrical portion 51;
- a first truncated portion 52, whose surfaces form a first angle with the horizontal (wherein this first angle is here lower than 45°);
- a second truncated portion 53, whose surfaces form a second angle with the horizontal (wherein this second angle is here higher than the first angle and can hence be, for example, higher than 45°);
- a third truncated portion 54, whose surfaces form a third angle with the horizontal (wherein this third angle is, for example, lower than the second angle, and here lower than the first angle, and can, for example, be lower than 30°);
- a fourth truncated portion 55, whose surfaces form a fourth angle with the horizontal (wherein this fourth angle is here comprised between the first angle and the second angle, and is for example comprised between 40° and 50°);

a fifth truncated portion 56, whose surfaces form a fifth angle with the horizontal (wherein this fifth angle is higher than the fourth angle).

Figure 3:
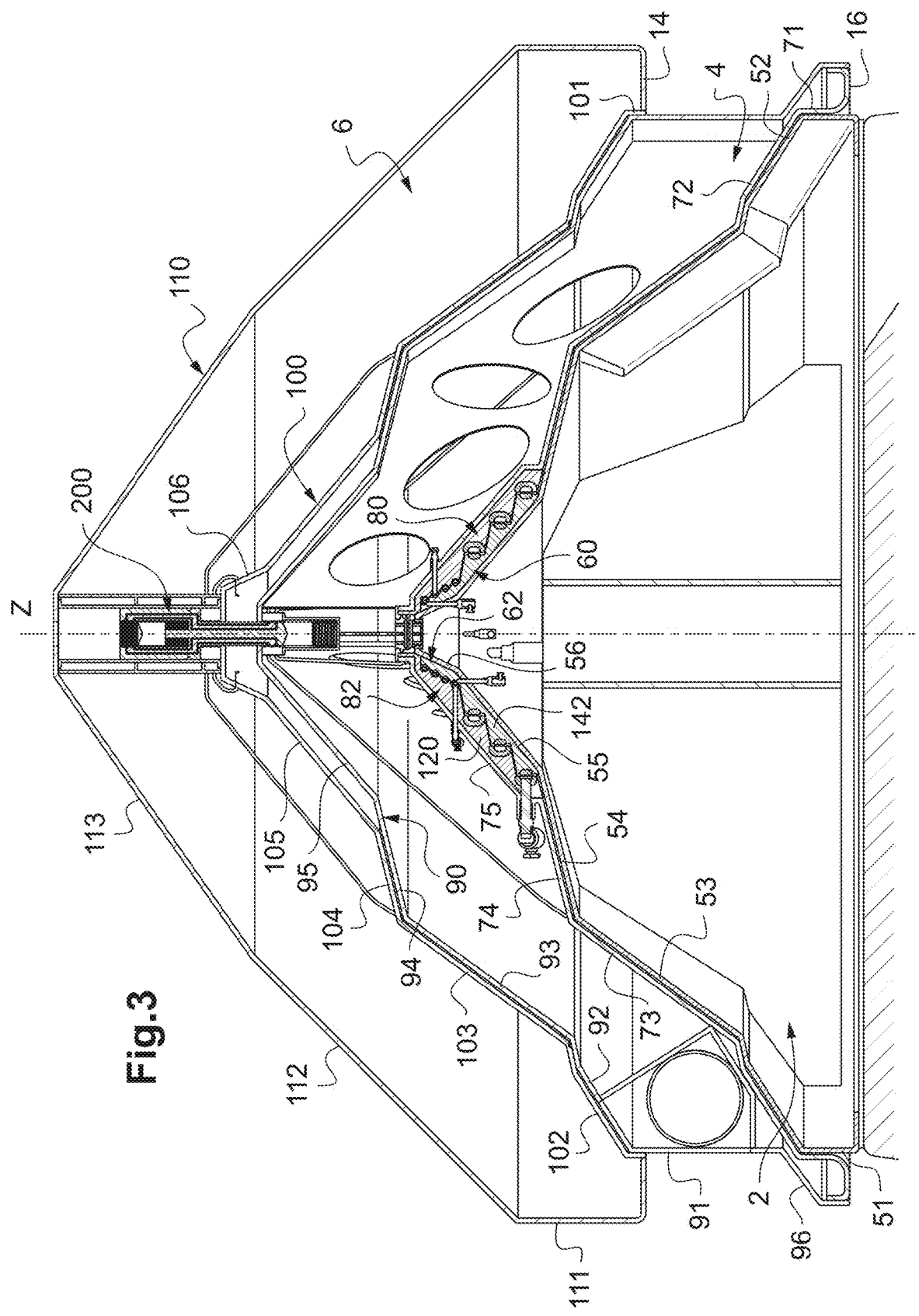
FIG. 3 shows an exemplary embodiment of the movable part, the stationary part and a cap when these latter are assembled to each other.

As can be clearly seen in FIGS. 3 and 4, these cylindrical and truncated portions 51, 52, 53, 54, 55, 56 are rotationally symmetrical about the already mentioned axis Z.

The cylindrical portion 51, the first truncated portion 52, the second truncated portion 53 and the third truncated portion 54 partly form the upper external surface of the stationary part 2, in regions where (as already indicated with reference to FIG. 1d) this upper external surface of the stationary part 2 is complementary of the lower external surface of the movable part 4 (described in detail hereinafter).

The fourth truncated portion 55 carries a first connection assembly 60. This first connection assembly 60 comprises a plurality of annular conductive tracks (here three annular conductive tracks) and hence extends over the whole periphery of the stationary part 2, by surrounding the fourth truncated portion 55. The fifth truncated portion 56 carries a second connection assembly 62.

This second connection assembly 62 comprises a plurality of annular conductive tracks (here four annular conductive tracks) and hence extends over the whole periphery of the stationary part, by surrounding the firth truncated portion 56.

The construction of the first connection assembly 60 and of the second connection assembly 62 is exposed hereinafter with reference to FIGS. 5 and 6.

The movable part 4 has a general shape that is rotationally symmetrical about the axis Z, forming a lid adapted to cover the stationary part 2 as shown in FIG. 3.

The movable part 4 comprises in particular for that purpose a lower casing 70 that defines a cavity (or concavity) 77 turned downwards (in the common position of the movable part 4 as shown in the Figures) and designed to receive the stationary part 2.

Precisely, the lower casing 70 comprises, from the horizontal and annular gripping surface 16 (here formed in this lower casing 70) to the bottom of the above-mentioned cavity 77:

a cylindrical portion 71;
a first truncated portion 72, whose surfaces form with the horizontal an angle identical to the first angle mentioned hereinabove;
a second truncated portion 73, whose surfaces form with the horizontal an angle identical to a second angle mentioned hereinabove;
a third truncated portion 74, whose surfaces form with the horizontal an angle identical to a third angle mentioned hereinabove;
a fourth truncated portion 75, whose surfaces form with the horizontal a fifth angle (wherein this fifth angle is here comprised between the first angle and the second angle).

As can be clearly seen in FIG. 3, the cylindrical portion 71, the first truncated portion 72, the second truncated portion 73 and the third truncated portion 74 of the lower casing 70 can hence cooperate (by shape complementarity) with, respectively, the cylindrical portion 51, the first truncated portion 52, the second truncated portion 53 and the third truncated portion 54 of the casing 50 of the stationary part 2.

The partial complementarity (already mentioned) of the upper external surface of the stationary part 2 and of the lower external surface of the movable part 4 is hence obtained, which allows an automatic alignment of the movable part 4 when the latter is deposited onto the stationary part 2, as described hereinabove with reference to FIG. 1d.

The fourth truncated portion 75 accommodates (here in its lower portion) a first connection assembly 80 and (here in its upper portion) a second connection assembly 82.

The first connection assembly 80 of the movable part 4 comprises a plurality of annular conductive tracks intended to cooperate with the respective annular conductive tracks of the first connection assembly 60 of the stationary part 2, as can be clearly seen in FIG. 3, and explained in more details hereinafter with reference to FIG. 5.

Likewise, the second connection assembly 82 of the movable part 4 comprises a plurality of annular conductive tracks intended to cooperate with the respective annular conductive tracks of the second connection assembly 62 of the stationary part 2.

The movable part 4 also comprises an upper casing 90 that includes (from the bottom to the top of FIGS. 3 and 4 and in the common position of the movable part 4):

an annular skirt 96 (here formed of a cylindrical portion surrounding the gripping surface 16 and a truncated portion);
a cylindrical portion 91;
a first truncated portion 92, whose surfaces form with the horizontal an angle identical to the first angle mentioned hereinabove;
a second truncated portion 93, whose surfaces form with the horizontal an angle identical to the second angle mentioned hereinabove;
a third truncated portion 94, whose surfaces form with the horizontal an angle identical to the third angle mentioned hereinabove;
a fourth truncated portion 95, whose surfaces form with the horizontal a sixth angle (wherein this sixth angle is here comprised between the first angle and the second angle, and can be equal to the firth angle mentioned hereinabove).

The cylindrical portion 91, the first truncated portion 92, the second truncated portion 93 and the third truncated portion 94 of the upper casing 90 partly form the upper external surface of the movable part 4, in regions where (as already indicated with reference to FIG. 1c) this upper external surface of the movable part 4 is complementary of the lower external surface of the cap 6 (described in detail hereinafter).

The cap 6 has a general shape that is rotationally symmetrical about the axis Z and comprise in particular a lower casing 100 that defines a cavity (or concavity) 107 turned downward (in the common position of the cap 6 as shown in the Figures) so as to receive (and hence cover) either the stationary part 2 (as in the case of the FIGS. 1a and 1b), or the movable part 4 (as in the case of FIGS. 1c and 1d).

Precisely, the lower casing 100 comprises, from the horizontal and annular gripping surface 14 (here formed in this lower casing 100) to the bottom of the above-mentioned cavity 107:

a cylindrical portion 101;
a first truncated portion 102, whose surfaces form with the horizontal an angle identical to the first angle mentioned hereinabove;
a second truncated portion 103, whose surfaces form with the horizontal an angle identical to the second angle mentioned hereinabove;

a third truncated portion 104, whose surfaces form with the horizontal an angle identical to the third angle mentioned hereinabove;

a fourth truncated portion 105, whose surfaces form with the horizontal a seventh angle (wherein this seventh angle is here comprised between the first angle and the second angle, and can be, for example, equal to the sixth angle mentioned hereinabove);

a fifth truncated portion 106, whose surfaces form with the horizontal an eighth angle (wherein this eighth angle is higher than the seventh angle mentioned hereinabove).

As can be clearly seen in FIG. 3, the cylindrical portion 101, the first truncated portion 102, the second truncated portion 103 and the third truncated portion 104 of the cap 6 can hence cooperate (by shape complementarity) with, respectively, the cylindrical portion 91, the first truncated portion 92, the second truncated portion 93 and the third truncated portion 94 of the upper casing 90 of the movable part 4.

It can be noticed that this also allows the cylindrical portion 101, the first truncated portion 102, the second truncated portion 103 and the third truncated portion 104 of the cap 6 to cooperate (by shape complementarity) with, respectively, the cylindrical portion 51, the first truncated portion 52, the second truncated portion 53 and the third truncated portion 54 of the casing 50 of the stationary part 2.

Hence, using truncated portions that form a same angle with the horizontal on the casing 50 of the stationary part 2, on the lower casing 70 of the movable part 4, on the upper casing 90 of the movable part 4 and on the lower casing 100 of the cap 6 (see, for example, the truncated portions 52, 72, 92, 102), allows a cooperation by shape complementarity between the cap 6 and the stationary part 2, or between the cap 6 and the movable part 4, or also between the stationary part 2 and the movable part 4.

As can be clearly seen in the Figures, it moreover results from these arrangements that certain truncated portions 72, 73, 74 of the lower casing 70 of the movable part 4 are, at any point, parallel to a corresponding truncated portion 92, 93, 94 of the upper casing 90 of the movable part 4.

The truncated portions of the stationary part 2, the movable part 4 and the cap 6 further having a rotationally cylindrical shape, they allow the automatic positioning of the stationary part 2 and/or the movable part 4 and/or the cap 6 with respect to each other (by simply depositing one of these elements onto the other).

The cap 6 moreover comprises an upper casing 110 of generally truncated shape. The upper casing 110 here comprises, from the gripping surface 14 to the apex of the cap 6, a cylindrical portion 111, a first truncated portion 112 (forming an eighth angle with the horizontal) and a second truncated portion 113 (forming a ninth angle with the horizontal, this ninth angle being here lower than the eighth angle mentioned hereinabove).

Each of the above-described elements (in particular the cap 6 and the movable part 4) has hence a generally truncated shape particularly adapted for the positioning of these objects in a seabed, in particular in regions in which the currents are strong. Indeed, this shape makes it possible in particular to limit the mechanical efforts created within these elements when they undergo the movements of water in which they are plunged.

The connection assemblies 60, 62, 80, 82 will now be described in more details with reference to FIGS. 5 and 6.

FIG. 5 shows the second connection assemblies 62, 82 as a whole and the first connection assemblies 60, 80 only partially. The following description hence relates to the second connection assemblies 62, 82, but can also apply to the first connection assemblies 60, 80.

The second connection assembly 82 of the movable part 4 comprises an intermediate element 120 carried by the lower casing 70, by being here in contact with this lower casing 70 (precisely with the fourth truncated portion 75). Thus, this intermediate element 120 is here received within the cavity 77 formed by the lower casing 70. The lower casing 70 hence forms a support to which the intermediate element 120 is mechanically connected.

As can be seen in FIGS. 3 and 4, the intermediate element 120 here extends over the whole height of the fourth truncated portion 75 and hence plays the role of intermediate element for the first connection assembly 80 of the movable part 4 and for the second connection assembly 82 of the movable part 4.

The intermediate element 120 extends over the whole periphery of the movable part 4 (i.e. over the whole periphery of the lower casing 70).

The intermediate element 120 is made of an elastically deformable (and electrically insulating) material, such as a flexible polymer. The intermediate element 120 can be, in practice, made of an insulating resin, for example a dielectric epoxy resin (such as a resin Axson® R22891-(98) hardened by a hardener Axson® RE 2030).

The intermediate element 120 carries a plurality of contact elements 122 (precisely three contact elements 122 for the first connection assembly 80 and four contact elements for the second connection assembly 82).

Each contact element 122 has a generally circular shape and surrounds the axis Z (axis of rotational symmetry of the movable part 4). Each contact element 122 here extends over the whole circumference of the intermediate element 120. As explained hereinafter, each contact element 122 is here embedded in the intermediate element 120 and flushes with a surface of the intermediate element 120 turned towards the axis Z (i.e. towards the centre of the cavity 77).

Each contact element 122 comprises a crown 124 and a set of claws 126 distributed over the whole circumference of the crown 124. The crown 124 has a generally toroidal shape and is made of an electrically conductive material, here cupper. The claws 126 are carried by a circular support 128 (as can be clearly seen in FIG. 6), this circular support 128 being itself fixed to the crown 124, for example by means of tack welding. The circular support 128 and the associated claws 126 form a circumferential comb 130 shown in FIG. 6.

The contact elements 122 are here each enclosed in a link element 132, made for example of a resin (preferably, a dielectric resin). This link element 132 extends over the whole circumference of the contact element 122. The link element 132 extends about the contact element 122 and has a C-shape in cross-section (as can be seen in FIG. 5), hence defining a housing receiving the corresponding crown 124.

The link element 132 is itself fixed in contact with the intermediate element 120.

To make the just-described assembly, it can be provided for example to mould each link element 132 (from resin) in contact with the corresponding crown 124, to pre-position (typically in a mould) the different link elements 132 with respect to the lower casing 70, then to cast the intermediate element 120 (made of flexible polymer) in contact with the lower casing 70 on the one hand and with the link elements 132 on the other hand.

As can be seen in FIG. 5 for one of the crowns 124, a conductive rod 134 extends between each crown 124 (by being in contact with this crown 124) and a connection assembly 136. Each conductive rod 134 hence extends (here in a horizontal direction) through the intermediate element 120 (wherein the conductive rods 134 can hence be positioned before the casting of the intermediate element 120 according to the just described method).

The different conductive rods 134 (each in contact with a crown 124) are for example distributed over the circumference of the lower casing 70.

The connection assembly 136 associated with each conductive rod 134 is electrically connected to a conductive wire of a cable connected to the movable part 4.

The second connection assembly 62 of the stationary part 2 comprises a plurality of crowns 140 (here four crowns 140) embedded in an insulating block 142 and having a cylindrical face forming an annular conductive track 144, this annular conductive track 144 flushing with the surface of the insulating block 142.

The crowns 140 (and hence the annular conductive tracks 144) extend over the whole circumference of the casing 50 of the stationary part 2.

The insulating block 142 is formed of a rigid material and located in contact with the casing 50 of the stationary part 2, outside the casing 50 (the insulating block 142 hence forming a convex support carrying the annular conductive tracks 144).

The insulating block 142 here extends along the fourth and fifth truncated portions of the stationary part 2 (so that this insulating block covers the first connection assembly 60 and the second connection assembly 62), as can be clearly seen in FIGS. 3 and 4.

As can be seen in FIG. 5 for one of the crowns 140, a conductive rod 146 extends between each crown 140 (by being in contact with this crown 140) and a connection assembly (not shown). Each conductive rod 146 hence extends (here in a vertical direction) through the insulating block 142.

The different conductive rods 146 (each in contact with a crown 140) are for example distributed over the circumference of the casing 50.

The connection assembly (not shown) associated with each conductive rod 146 is electrically connected to a conductive wire of a cable connected to the stationary part 2.

The diameter of the crowns 140 carried by the stationary part 2 (at the annular conductive track 144) is substantially equal to (and in practice slightly greater than) the inner diameter of the associated circumferential comb 130 so that the claws 126 of the circumferential comb 130 (belonging to a contact element 122) comes against the corresponding annular conductive track 144 (and that, for each pair of crowns 124, 140) when the movable part 4 is placed onto the stationary part 2, as shown in FIG. 3.

Thanks to the intermediate element 120 made of an elastically deformable material, a good positioning (and hence a good electrical contact) is ensured between the respectively associated contact elements 122 and conductive tracks 144, even when a misalignment exists between the casing 50 of the stationary part 2 and the lower casing 70 of the movable part 4 (this misalignment being compensated for by a deformation of the intermediate element 120).

Figure 7:
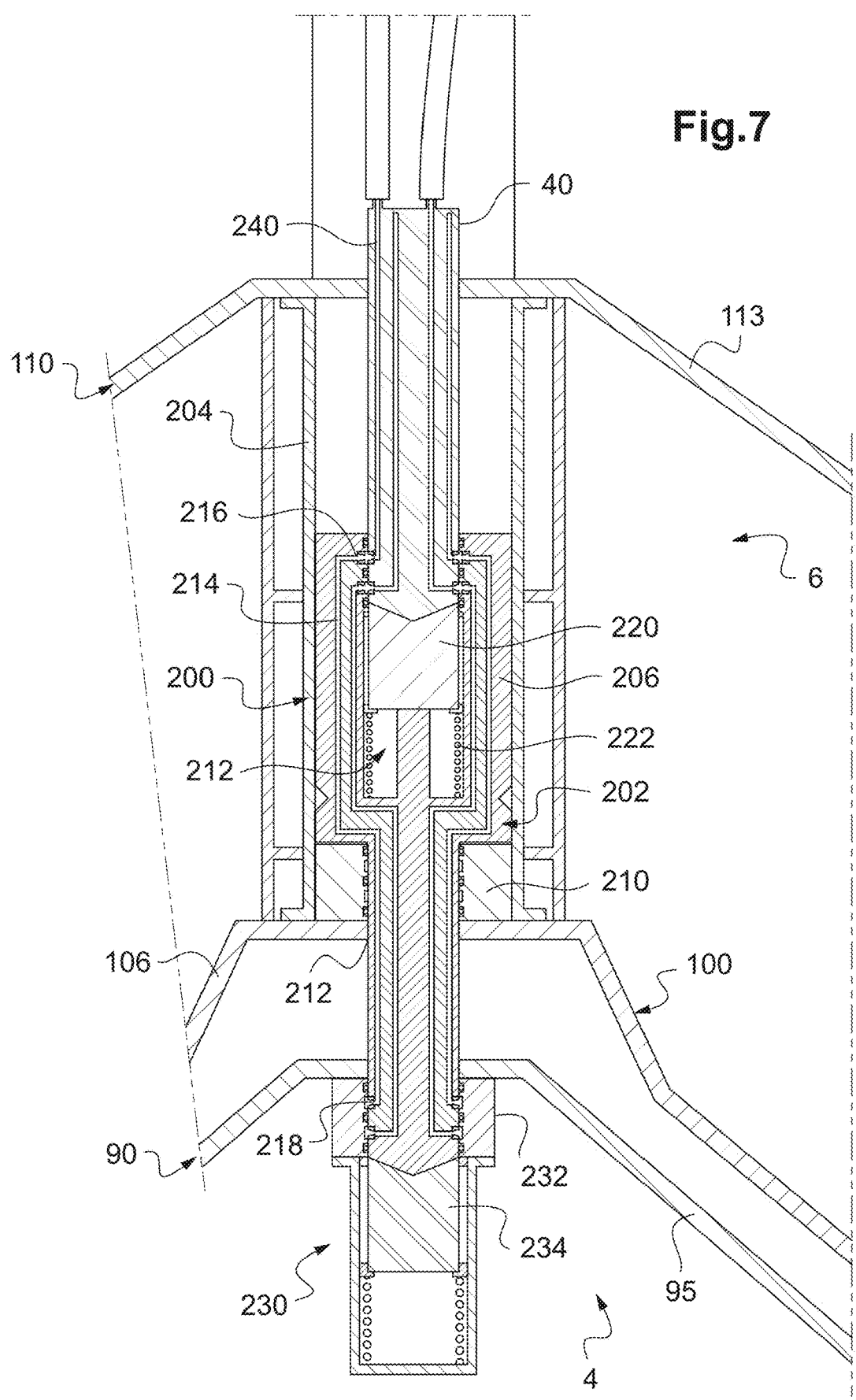
FIG. 7 shows a hydraulic unit equipping the cap and the movable part.

FIG. 7 shows a hydraulic unit equipping the cap 6 and the movable part 4.

The cap 6 comprises a hydraulic system 200 designed to receive the injection needle 40 of the lifting tool 10 in order to supply with fluid (here oil) either the cap 6 itself, or the movable part 4 when this movable part 4 carries the cap 6, as in the situation shown in FIG. 1d and described hereinabove.

The supply of the cap 6 or the movable part 4 with fluid is used when the concerned element (cap 6 or movable part 4) is deposited onto another element (stationary part 2 or support 8), in order to expel the sea water present between these two elements.

The hydraulic system 200 comprises a cylinder 202 housed (with possibility of sliding) in a cylinder body 204 mounted between the lower casing 100 of the cap 6 and the upper casing 110 of the cap 6. The cylinder 202 and the cylinder body 204 here extend along the symmetry axis Z of the cap 6.

The cylinder 202 comprises a slide 206 slidingly mounted in the cylinder body 204 and a needle 208 extending from the slide 206 towards the lower casing 100 of the cap 6.

The needle 208 passes through a distribution system 210 equipping the cap 6 and, when the slide is in lower position in the cylinder body 204, as shown in FIGS. 3, 4 and 7, extends through an opening 212 formed in the lower casing 100 in order to reach the movable part 4, as explained hereinafter.

The slide 206 comprises an inner housing 212 sized so as to receive the injection needle 40 of the lifting tool 10 (i.e. having an inner size identical to the outer size of the injection needle 40, here an inner diameter equal to the outer diameter of the injection needle 40).

The cylinder 202 comprises at least one hydraulic circuit 214 (here four such hydraulic circuits) that extends between an inlet orifice 216, formed on a wall of the slide 206 forming the inner housing 212, and an outlet orifice 218, formed on an outer wall of the needle 208. The hydraulic circuit 214 hence extends inside the slide 206 and the needle 208.

The inner housing 212 moreover receives a plug 220 movable between a first position (not shown), in which this plug 220 obstructs the inlet orifice 216 (here the four inlet orifices), and a second position, in which this plug clears the inlet orifice 216.

Here, elastic return means 222 (such as a spring) are further provided, positioned in the inner housing 212 so as to push the plug 220 towards the first position, the plug 220 being bought in the second position under the effect of the injection needle 40 of the cap 6 when this injection needle 40 is inserted into the inner housing 212.

The movable part 4 also comprises a hydraulic system 230. This hydraulic system 230 comprises a distribution system 232 that extends about a central space intended to receive the needle 208 of the hydraulic system 200 of the cap 6, as can be clearly seen in FIG. 7.

The hydraulic system 230 of the movable part 4 also comprises a plug 234 brought back by elastic return means 236 (here a spring) into the above-mentioned central space so as to obstruct orifices (not shown) of the distribution system 232 in the absence of the needle 208. As shown in FIG. 7, the plug 234 is however able to be displaced against the force exerted by the elastic return means 236 when the needle 208 is inserted into the central space through an opening 236 formed in the upper casing 90 of the movable part 4.

In the position shown in FIG. 7, the injection needle 40 of the lifting tool 10 is inserted into the inner housing 212 so that at least one hydraulic circuit 240 of this injection needle 40 (here four such hydraulic circuits) (each) communicate, via the inlet orifice 216, with a hydraulic circuit 214 of the hydraulic system 200 of the cap 6.

Moreover, the needle 208 of the hydraulic system 200 being inserted into the central space surrounded by the distribution system 232 of the movable part 4, the outlet orifice 218 of the hydraulic circuit 214 (or of each such hydraulic circuit) is in alignment with an orifice (not shown) of the distribution system 232.

The lifting tool 10 can hence supply the distribution system 232 of the movable part 4 with fluid (here oil) (via the hydraulic circuit 240 of the injection needle 40 and the hydraulic circuit 214 of the hydraulic system 200 of the cap 6), the distribution system 232 being moreover designed to inject the fluid between the movable part 4 and the stationary part 2 when the movable part 4—cap 6 unit is deposited onto the stationary part 2, as shown in FIG. 1*d*.

Moreover, when the slide 206 is in upper position in the cylinder body 204, the outlet orifice 218 is in alignment with an orifice of the distribution system 210 of the cap 6. The lifting tool 10 can hence, in this case, supply the distribution system 210 of the cap 6 with fluid (here oil) (via the hydraulic circuit 240 of the injection needle 40 and the hydraulic circuit 214 of the hydraulic system 200 of the cap 6), the distribution system 210 being moreover designed to inject the fluid between the cap 6 and the element (for example, the support 8 at step 1*e* described hereinabove) onto which the cap 6 is deposited.

The invention claimed is:

1. A method for connecting a movable connector part to a stationary connector part, wherein, initially, the movable part is placed on a support and the stationary part is covered by a cap, the method comprising the following steps:
   gripping the cap using a lifting tool;
   depositing the cap onto the movable part using the lifting tool; and
   transporting, using the lifting tool, the cap—movable part unit onto the stationary part for connecting the stationary part and the movable part to each other,
   the stationary part comprising:
   a convex external cover having a rotational symmetry; and
   a plurality of circular electrical tracks.

2. The connection method according to claim 1, wherein the movable part comprises a lower casing having at least one truncated portion and an upper casing having at least one truncated portion, the truncated portion of the lower casing being, at any point, parallel to the truncated portion of the upper casing.

3. The connection method according to claim 1, comprising a subsequent step of depositing the cap onto the support using the lifting tool.

4. The connection method according to claim 1, wherein the stationary part is fixed to a seabed.

5. The connection method according to claim 1, wherein the support is fixed to a seabed.

6. The connection method according to claim 1, wherein the stationary part is connected to an electric power transmission system.

7. The connection method according to claim 1, wherein the movable part is connected to an electric power generator.

8. The connection method according to claim 1, wherein the movable part has a concavity designed to cooperate with said external cover.

9. The connection method according to claim 1, wherein the cap comprises means for receiving a fluid and means for injecting said fluid into at least one duct formed in the movable connector.

* * * * *